United States Patent Office 3,836,545
Patented Sept. 17, 1974

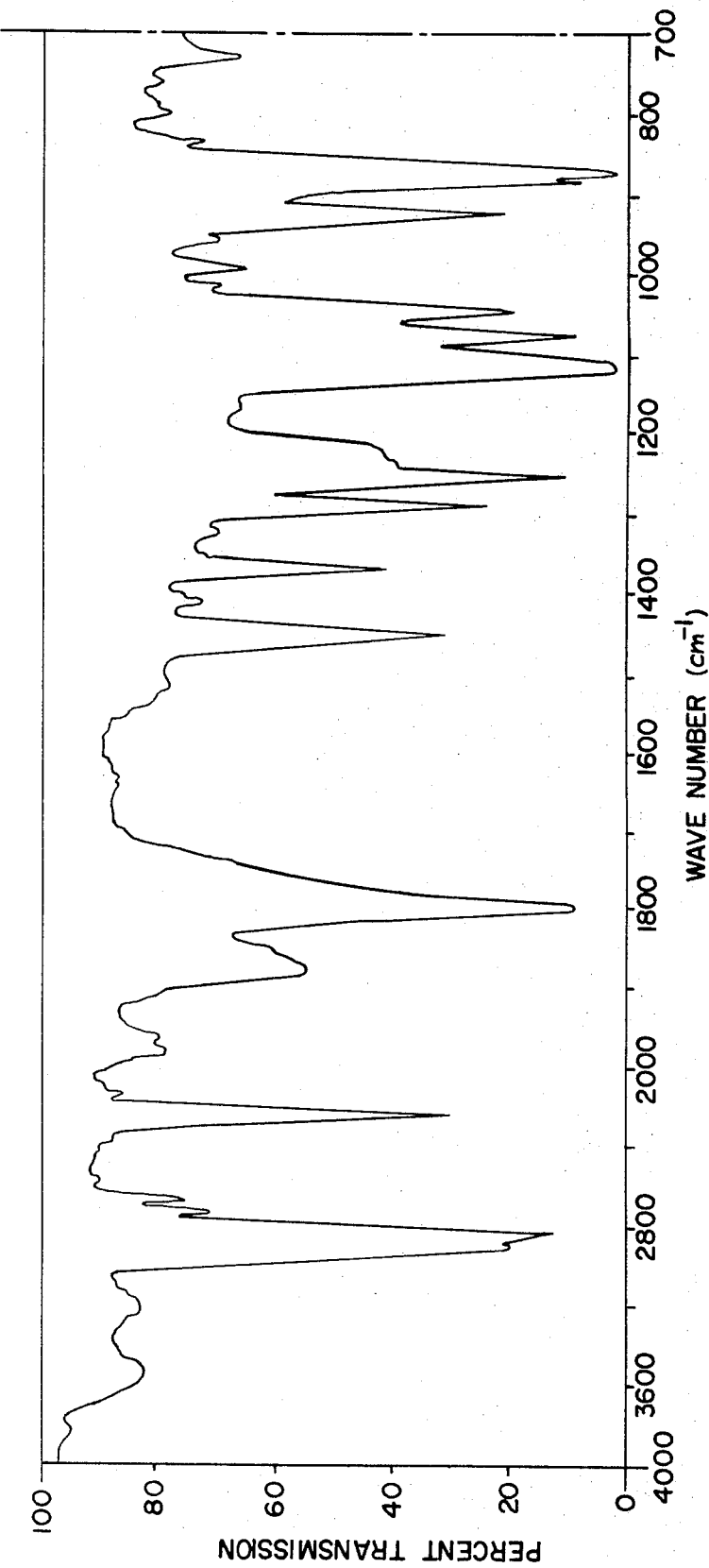

3,836,545
ASPARTIC ANHYDRIDE HAVING A MASKED AMINO GROUP
Naohiko Yasuda and Yasuo Ariyoshi, Kanagawa, and Naotake Sato, Tokyo, Japan, assignors to Ajinomoto Co., Inc., Tokyo, Japan
Filed Dec. 13, 1971, Ser. No. 207,104
Claims priority, application Japan, Dec. 14, 1970, 45/111,492
Int. Cl. C07d 5/04
U.S. Cl. 260—346.8 R        10 Claims

ABSTRACT OF THE DISCLOSURE

Aspartic anhydride having a masked amino group is readily obtained by reacting 3-isocyanato-2,5-dioxotetrahydrofuran

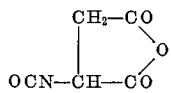

with an alcohol in an inert solvent. The furan derivative is obtained from aspartic acid, its salts and addition compounds with mineral acids, and the corresponding addition compounds of aspartic anhydride by reaction with phosgene in an inert solvent at elevated temperature.

---

The invention relates to derivatives of L-aspartic anhydride having masked amino groups, to a method of preparing the same, and to a novel intermediate compound formed during the preparation.

L-aspartic anhydride having a masked amino group is a known intermediate in peptide synthesis. It reacts with amino acids and their esters or oligopeptides to form or lengthen peptide chains. Masked aspartic anhydride was synthesized heretofore from aspartic acid by Schotten-Baumann reaction with an acyl chloride to produce N-acyl-aspartic acid which was thereafter dehydrated to the anhydride by means of N,N'-dicyclohexylcarbodiimide or acetic anhydride. The known method requires too many steps and too many relatively costly reagents to be practical on an industrial scale. It has now been found that aspartic acid and closely related derivatives, such as the aspartate salts, and the mineral acid addition salts of aspartic acid and aspartic anhydride can be converted to 3-isocyanato-2,5-dioxotetrahydrofuran in very good yields by reaction with phosgene in an inert organic solvent, and the isocyanate, not known heretofore, readily reacts with alcohols to produce aspartic anhydride having a masked amino group.

The alkali metal and ammonium salts of aspartic acid are most readily available, and therefore preferred when aspartate salts are to be employed as starting materials. The addition salts of aspartic acid and aspartic anhydride with the hydrogen halides and particularly with hydrogen chloride are least expensive among the addition compounds with mineral acids.

The reaction between phosgene and aspartic acid or its afore-mentioned derivatives is carried out by contacting phosgene with a solution or suspension of aspartic acid or its afore-mentioned derivatives in an inert organic solvent. It is most convenient to keep the solvent saturated with phosgene by passing a stream of phosgene through the solvent in which the aspartic acid or derivative is dispersed as a solute or in suspension. The reaction rate is enhanced by increasing the temperature and by agitating the reaction mixture. It is also possible, and sometimes more convenient, to employ a solution of phosgene in an inert organic solvent, gradually adding aspartic acid or its derivative to the phosgene solution, and to heat and agitate the mixture. Also, the phosgene and the aspartic acid or derivative may be dispersed in separate solvent media, and the two liquid batches combined, heated, and stirred to achieve the desired result.

Aspartic acid and its salts require two moles phosgene, and one mole phosgene is needed for reaction with the hydrohalide salts of aspartic acid or its anhydride or per aspartic acid moiety in the addition salts with di- or polybasic mineral acids. A significant excess of phosgene beyond these amounts is not needed, but is not harmful if present. The reaction is monitored most conveniently and precisely by observing the characteristic absorption band of the isocyanato group in the infrared spectrum of the reaction mixture, and the reaction may be terminated when no further increase in absorption occurs.

The sole figure of the attached drawing shows the infrared absorption spectrum of 3-isocyanato-2,5-dioxotetrahydrofuran.

The solvent employed in preparing isocyanato-2,5-dioxotetrahydrofuran may be chosen freely among those known to be inert to the reactants and the product and are too numerous and diverse to permit listing of a fully representative group. Merely by way of example and because of their low cost and ready availability, there may be mentioned ethyl acetate, triethyl phosphate, ethyl ether, tetrahydrofuran, dioxane, acetonitrile, chloroform, ethylene dichloride, carbon tetrachloride, benzene, toluene, and xylene. Many others will readily suggest themselves to those skilled in the art and may be resorted to if convenient.

When aspartic acid and its salts are reacted with phosgene at normal room temperature or below, the principal product is aspartic anhydride hydrochloride. The balance shifts markedly toward the desired isocyanate as the temperature is raised beyond 50° C, and better results are obtained at 60° C. or above. Highest yields of the desired product are achieved at 90° to 100° C. An optically active starting material is gradually racemized if the reaction is carried out at much higher temperatures. A very favorable balance between yield and absence of racemization is normally achieved at 50° to 120° C.

The 3-isocyanato-2,5-dioxotetrahydrofuran is recovered from the reaction mixture most conveniently by evaporating the solvent together with the hydrogen chloride generated and any excess of phosgene present. The residue may then be distilled in a vacuum if desired.

The choice of an alcohol to be reacted with 3-isocyanato-2,5-dioxotetrahydrofuran is normally controlled by the ease with which the acyl group formed can later be split off from the nitrogen atom of the masked amino group, if the aspartic anhydride with masked amino group is intended for peptide synthesis. The preferred masking moieties in this case are those known in synthetic peptide chemistry, such as benzyl alcohol, anisalcohol, p-chlorobenzyl alcohol, tert-butyl alcohol, tert-amyl alcohol, and the like which react with the isocyanato group to form amino groups masked by the corresponding carbobenzoxy, p-methoxycarbobenzoxy, p-chlorocarbobenzoxy, tert-butyloxycarbonyl, and tert-amyloxycarbonyl groups. However, the isocyanate radical is known to react with all alcoholic hydroxyl groups, and other alcohols may be employed if so desired to produce the corresponding N-substituted carbamic acid esters.

The amount of the alcohol employed is not critical, but should not be less than one mole per mole of the isocyanate, if all amino groups of the aspartic anhydride are to be masked. Some of the alcohols mentioned above, such as benzyl alcohol and its p-substitution products, form esters with aspartic anhydride under the reaction conditions, but the ester formation is much slower than the alcoholysis of the isocyanato group. It is convenient, therefore, to observe the infrared spectrum of the reaction mixture, and to terminate the reaction when the characteristic absorption band of the isocyanato group disappears, and before significant amounts of the ester can be formed.

The reaction between the alcohol and 3-isocyanato-2,5-dioxotetrahydrofuran may be performed without solvent or in an inert organic solvent medium, and the solvents referred to above may be employed in the terminal step of this invention. The same solvent may be employed in the alcoholysis step as in the synthesis of the isocyanate, and it is not necessary to recover the latter in a substantially pure form. The alcohol may be added directly to the mixture in which the isocyanate was formed.

The reaction temperature for the second and last step is not critical, and temperatures between ambient temperature (20° C.) and 100° C. are entirely practical if the solvent employed is liquid within these limits.

The recovery of the aspartic anhydride having a masked amino group is simple and does not require special precautions. The specific procedure chosen depends on the solvent and the excessive alcohol, if any, that need to be removed. However, the crude reaction mixture containing the masked aspartic anhydride is useful as such in many peptide syntheses, and separation of the aspartic anhydride having a masked amino group may not be called for.

The following examples are further illustrative of this invention.

EXAMPLE 1

20 g. L-aspartic acid was suspended in 130 ml. dioxane by vigorous agitation, and stirring was continued while a stream of phosgene was passed through the solution so as to keep the same saturated. After approximately 30 minutes, the suspended material was dissolved. During the next four hours, the solution was refluxed while the phosgene supply was continued. Thereafter, the dioxane was evaporated in a vacuum, and the viscous, liquid residue was identified as 3-isocyanato-2,5-dioxotetrahydrofuran by its infrared spectrum in a paste with dioxane as shown in the appended drawing. It could be distilled at about 140° C./2 mm. Hg.

White, needle-shaped crystals were obtained by crystallizing the liquid from a mixture of tetrahydrofuran, ethyl ether, and petroleum ether. They quickly decomposed in air by reaction with water vapor.

The same compound was obtained in an analogous manner from 18 g. L-aspartic acid anhydride hydrochloride suspended in 150 ml. dioxane by reaction with phosgene in 100% yield.

EXAMPLE 2

The influence of process variables on the yield of recovered 3-isocyanato-2,5-dioxotetrahydrofuran is evident from the following series of seven runs which were performed as in Example 1 except as specifically set forth. The aspartic acid or its derivative employed as a starting material and its weight, the inert solvent and its weight, the time and temperature of the reaction with phosgene after dissolution of the starting material, and the yield based on the aspartic acid or derivative are given for each run:

Run 1: 20 g. aspartic acid in 150 ml. tetrahydrofuran; 8 hours at 60° C.—90% yield
Run 2: 20 g. aspartic acid hydrochloride in 100 ml. dioxane; 4 hours at 100° C.—95% yield
Run 3: 20 g. sodium aspartate in 150 ml. dioxane; 4 hours at 100° C.—95% yield
Run 4: 20 g. aspartic acid in 150 ml. ethyl acetate 7 hours at 75° C.—80% yield
Run 5: 20 g. aspartic acid in 100 ml. acetonitrile; 3 hours at 75° C.—40% yield
Run 6: 20 g. aspartic acid in 150 ml. carbon tetrachloride; 7 hours at 75° C.—30% yield
Run 7: 20 g. aspartic acid in 150 ml. toluene; 8 hours at 110° C.—25% yield

EXAMPLE 3

20 g. L-aspartic acid was suspended in 150 ml. dioxane, and the suspension was refluxed for four hours while a stream of phosgene was passed therethrough. The phosgene still present was then purged from the reaction solution by means of nitrogen.

A solution of 16 g. benzyl alcohol in 100 ml. dioxane was added dropwise to the reaction mixture over a period of 2.5 hours at reflux temperature, and refluxing was continued for two hours thereafter. The solvent was then evaporated in a vacuum.

The residue, when crystallized from a mixture of ether and petroleum ether weighed 28 g. (75% yield based on the original L-aspartic acid). It was identified as N-carbobenzoxy-L-aspartic anhydride by its melting point and infrared spectrum.

EXAMPLE 4

20 g. L-aspartic acid was reacted with phosgene in 150 ml. dioxane as in Example 3, and the solvent was evaporated thereafter in a vacuum. The residue was dissolved in 100 ml. ethyl acetate, and a solution of 16 g. benzyl alcohol in 80 ml. ethyl acetate was added dropwise to the isocyanate solution at refluxing temperature over a period of 2.5 hours whereafter heating was continued for two hours longer. The characteristic absorption band of the isocyanato group had disappeared by then from the infrared spectrum of the reaction mixture.

The solvent was evaporated in a vacuum, and 27.7 g. N-carbobenzoxy-L-aspartic anhydride was recovered from the residue by crystallization from ethyl acetate and petroleum ether (74% yield). When recrystallized from ethyl ether and petroleum ether, the compound formed needle-shaped crystals melting at 108° C.

EXAMPLE 5

The procedure of Example 4 was repeated to produce 3-isocyanato-2,5-dioxotetrahydrofuran which was dissolved in 100 ml. toluene. A solution of 20.7 g. (0.15 mole) anisalcohol in 50 ml. toluene was added dropwise at refluxing temperature as in Example 4, and refluxing was continued for 24 hours. N-p-methoxy-carbobenzoxy-L-aspartic anhydride was recovered from the reaction mixture in a yield of 70% based on the initial amount of L-aspartic acid.

When an equimolecular amount of p-chlorobenzyl alcohol was substituted for the anisalcohol in the above procedure, chloroform was employed as the solvent, and the ultimate reaction carried out at 62° C. for 10 hours, the expected N-p-chlorocarbobenzoxy-L-aspartic anhydride was obtained in a yield of 75%.

While the invention has been described with particular reference to specific embodiments, it is to be understood that it is not limited thereto, but is to be construed broadly and restricted solely by the scope of the appended claims.

What is claimed is:

1. The compound 3-isocyanato-2,5-dioxotetrahydrofuran.

2. A method of producing 3-isocyanato-2,5-dioxotetrahydrofuran which comprises contacting phosgene with a member of the group consisting of aspartic acid, the aspartates of the alkali metals and ammonium, and the mineral acid addition salts of aspartic acid and of aspartic anhydride in an inert, liquid solvent at 50° C. to 120° C. until said 3 - isocyanato - 2,5 - dioxotetrahydrofuran is formed.

3. A method as set forth in claim 2, wherein said member is aspartic acid, an aspartate of an alkali metal or ammonium, or a mineral acid addition salt of aspartic acid.

4. A method as set forth in claim 3, wherein said formed 3-isocyanato-2,5-dioxotetrahydrofuran is recovered from said solvent.

5. A method as set forth in claim 3, wherein said mineral acid is hydrogen chloride.

6. A method as set forth in claim 3, wherein the amount of said phosgene is at least two moles per mole of said aspartic acid or said aspartate, and one mole per aspartic acid moiety in said mineral acid addition salt.

7. A method of preparing aspartic anhydride having a masked amino group which comprises reacting 3-isocyanato-2,5-dioxotetrahydrofuran with at least one mole of an alcohol per mole of said 3-isocyanato-2,5-dioxotetrahydrofuran until said aspartic anhydride having said masked amino group is formed.

8. A method as set forth in claim 7, wherein the temperature of said alcohol during said reacting is between 20° and 100° C.

9. A method as set forth in claim 7, wherein said 3-isocyanato-2,5-dioxotetrahydrofuran is reacted with said alcohol in an inert; liquid, organic solvent, and the formed aspartic anhydride having said masked amino group is recovered from said solvent.

10. A method as set forth in claim 7, wherein said 3-isocyanato-2,5-dioxotetrahydrofuran prior to said reacting thereof with said alcohol is formed by contacting phosgene with a member of the group consisting of aspartic acid, the aspartates of the alkali metals and ammonium, and the mineral acid addition salts of aspartic acid, in an inert, liquid organic solvent until said compound is formed, the amount of said phosgene being at least two moles per mole of said aspartic acid or said aspartates, and at least one mole per aspartic acid moiety in said mineral acid addition salts.

References Cited

UNITED STATES PATENTS 3,462,460  8/1969  Kollonitsch _____ 260—346.8

FOREIGN PATENTS 646,033  11/1950  Great Britain.

OTHER REFERENCES

Humphlett et al., Journal of Organic Chemistry (1961), vol. 26, pp. 2507–10.

Wagner and Zook, Synthetic Organic Chemistry, N.Y., Wiley (1953), pp. 558–9.

NORMA S. MILESTONE, Primary Examiner

B. I. DENTZ, Assistant Examiner